US011204281B1

(12) United States Patent
Ouellette et al.

(10) Patent No.: US 11,204,281 B1
(45) Date of Patent: Dec. 21, 2021

(54) ENHANCED TEMPERATURE MEASUREMENT TECHNIQUES

(71) Applicant: Sensormatic Electronics, LLC, Boca Raton, FL (US)

(72) Inventors: Jason M. Ouellette, Sterling, MA (US); Allen Houston, Lisburn (GB)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 0 days.

(21) Appl. No.: 17/143,727

(22) Filed: Jan. 7, 2021

Related U.S. Application Data

(60) Provisional application No. 63/074,364, filed on Sep. 3, 2020.

(51) Int. Cl.
  *G01J 5/00* (2006.01)
  *G06K 9/00* (2006.01)
  *H04N 5/33* (2006.01)
  *H04N 7/18* (2006.01)
  *G08B 21/18* (2006.01)
  *G07C 9/26* (2020.01)

(52) U.S. Cl.
  CPC ........ *G01J 5/0025* (2013.01); *G06K 9/00248* (2013.01); *G06K 9/00255* (2013.01); *G06K 9/00771* (2013.01); *G07C 9/26* (2020.01); *G08B 21/182* (2013.01); *H04N 5/33* (2013.01); *H04N 7/18* (2013.01); *G01J 2005/0048* (2013.01); *G01J 2005/0077* (2013.01)

(58) Field of Classification Search
None
See application file for complete search history.

(56) References Cited

U.S. PATENT DOCUMENTS

| 6,496,594 | B1 * | 12/2002 | Prokoski | A61B 5/1176 |
| | | | | 382/118 |
| 10,909,835 | B1 * | 2/2021 | Singh | G01J 5/10 |
| 10,978,199 | B2 * | 4/2021 | Boisvert | G05B 15/02 |
| 2005/0238210 | A1 * | 10/2005 | Sim | G06K 9/00221 |
| | | | | 382/118 |

(Continued)

FOREIGN PATENT DOCUMENTS

GB 2426327 A * 11/2006 ......... G06K 9/00369

*Primary Examiner* — Stefan Gadomski
(74) *Attorney, Agent, or Firm* — Arent Fox LLP

(57) ABSTRACT

Example implementations include a method, apparatus and computer-readable medium for determining a set of temperature readings of a person attempting to proceed beyond an area. The implementations further include detecting the person entering the area and detecting a facial area of the person. The implementations further include sending location information of the facial area to a sensing device. The implementations further include generating a thermal image of the person and determining a first set of temperature readings. The implementations further include determining a first set of temperature differences comprising one or more temperature differences between the temperature readings in the first set. The implementations further include determining whether one or more of the temperature differences in the first set does not satisfy a threshold and generating a notification in response to the determination. Additionally, the implementations include transmitting the notification to one or more output devices.

16 Claims, 5 Drawing Sheets

(56) References Cited

U.S. PATENT DOCUMENTS

| | | | |
|---|---|---|---|
| 2006/0000892 A1* | 1/2006 | Bonalle | G06Q 20/40145 |
| | | | 235/380 |
| 2006/0016875 A1* | 1/2006 | Bonalle | G07C 9/257 |
| | | | 235/380 |
| 2006/0082439 A1* | 4/2006 | Bazakos | G06K 9/00228 |
| | | | 340/5.82 |
| 2006/0140444 A1* | 6/2006 | Sheu | G06K 9/00248 |
| | | | 382/103 |
| 2007/0153871 A1* | 7/2007 | Fraden | G01J 5/0022 |
| | | | 374/121 |
| 2010/0164680 A1* | 7/2010 | Yancey | G07C 9/27 |
| | | | 340/5.32 |
| 2015/0204556 A1* | 7/2015 | Kusukame | F24F 11/30 |
| | | | 165/237 |
| 2019/0147676 A1* | 5/2019 | Madzhunkov | H04N 5/232 |
| | | | 340/5.2 |
| 2019/0205655 A1* | 7/2019 | Matsuoka | G06K 9/00228 |
| 2019/0207932 A1* | 7/2019 | Bud | H04W 12/06 |
| 2020/0105407 A1* | 4/2020 | Soreefan | G01J 5/522 |
| 2020/0253483 A1* | 8/2020 | Chase | G06K 9/00362 |
| 2020/0334930 A1* | 10/2020 | Masood | G07C 9/27 |
| 2020/0390337 A1* | 12/2020 | Frank | A61B 5/165 |
| 2020/0397306 A1* | 12/2020 | Frank | A61B 5/0295 |
| 2021/0110625 A1* | 4/2021 | Kawase | G07C 9/257 |
| 2021/0150186 A1* | 5/2021 | Lehman | G06K 9/00281 |

* cited by examiner

ENHANCED TEMPERATURE MEASUREMENT TECHNIQUES

CROSS-REFERENCE TO RELATED APPLICATIONS

This application claims priority to U.S. Provisional Patent Application 63/074,364 titled "ENHANCED TEMPERATURE MEASUREMENT TECHNIQUES" filed on Sep. 3, 2020, the disclosures of which are hereby incorporated by reference.

TECHNICAL FIELD

The described aspects relate to temperature measurement systems and specifically to enhanced temperature measurement techniques.

BACKGROUND

In the context temperature measurement systems, improvements in accuracy of the temperature measurement systems are often desirable. For example, a single temperature reading at a single point on the body of a person may not be a reliable indicator of actual body temperature. Further, obtaining a temperature readings of a person usually requires someone to be in physical proximity of the person

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of determining a set of temperature readings of a person accessing an area. The method includes detecting, at an imaging device, the person entering the area. The method further includes detecting, at the imaging device, a facial area of the person. The method further includes sending, from the imaging device, location information of the facial area of the person to a sensing device. The method further includes generating, at the sensing device, a thermal image of the person. The method further includes determining, at the sensing device, based on the location information of the facial area, a first set of temperature readings, each of the temperature readings in the first set corresponding to a point of the facial area of the person. The method further includes determining, at a processor, a first set of temperature differences comprising one or more temperature differences between the temperature readings in the first set of temperature readings. The method further includes determining, at the processor, whether one or more of the temperature differences in the first set of temperature differences does not satisfy a threshold. The method further includes reading, at a card reader, a badge of the person. The method further includes authenticating the person, based at least on the reading of the badge. The method further includes generating, at the processor, a notification when at least one of the temperature differences in the first set of temperature differences does not satisfy the threshold, the notification indicating whether a person is allowed to proceed beyond the area based at least on the authenticating the person and the first set of temperature differences. The method further includes transmitting, from the processor, the notification to one or more output devices.

Another example implementation includes temperature measurement system for determining a set of temperature readings of a person attempting to proceed beyond an area, the temperature measurement system comprising an imaging device configured to detect a person attempting to proceed beyond the area. The imaging device configured to detect a facial area of the person. The imaging device further configured to send location information of the facial area of the person to a sensing device. Additionally, the sensing device configured to generate a thermal image of the person, wherein the first profile comprises one or more configuration parameters, wherein values of each of the one or more configuration parameters of the first profile are based on the first metadata. The sensing device further configured to determine, based on the location information of the facial area, a first set of temperature readings, each of the first set of temperature readings corresponding to a point of the facial area of the person. The temperature measurement system further comprising a memory in communication with a processor. The processor configured to determine a first set of temperature differences comprising one or more temperature differences between the temperature readings in the first set of temperature readings. The processor further configured to determine whether one or more of the temperature differences in the first set of temperature differences does not satisfy a threshold. The processor further configured to read a badge at a card reader. The processor further configured to authenticate the person, based at least on the reading of the badge. The processor further configured to generate a notification when at least one of the temperature differences in the first set of temperature differences does not satisfy the threshold, the notification indicating whether a person is allowed to proceed beyond the area, based at least on the authentication of the person and the first set of temperature differences. Additionally, the processor configured to transmit the notification to one or more output devices.

Another example implementation includes a non-transitory computer-readable medium, storing instructions for determining a set of temperature readings of a person attempting to proceed beyond an area, the instructions executable by a processor configured to detect, at an imaging device, the person entering the area. The processor further configured to detect, at the imaging device, a facial area of the person, send, from the imaging device, location information of the facial area of the person to a sensing device. The processor further configured to generate, at the sensing device, a thermal image of the person. The processor further configured to determine, at the sensing device, based on the location information of the facial area, a first set of temperature readings, each of the temperature readings in the first set corresponding to a point of the facial area of the person. The processor further configured to determine a first set of temperature differences comprising one or more temperature differences between the temperature readings in the first set of temperature readings. The processor further configured to read, at a card reader, a badge of the person. The processor further configured to authenticate the person, based at least on the reading of the badge. The processor further configured to determine whether one or more of the temperature differences in the first set of temperature differences does not satisfy a threshold. The processor further configured to generate a notification when at least one of the temperature differences in the first set of temperature differences does not satisfy the threshold, the notification indicating whether the person is allowed to proceed beyond the area based at least on the authenticating the person and the first set of temperature differences. The processor further configured to transmitting, from the processor, the notification to one or more output devices.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
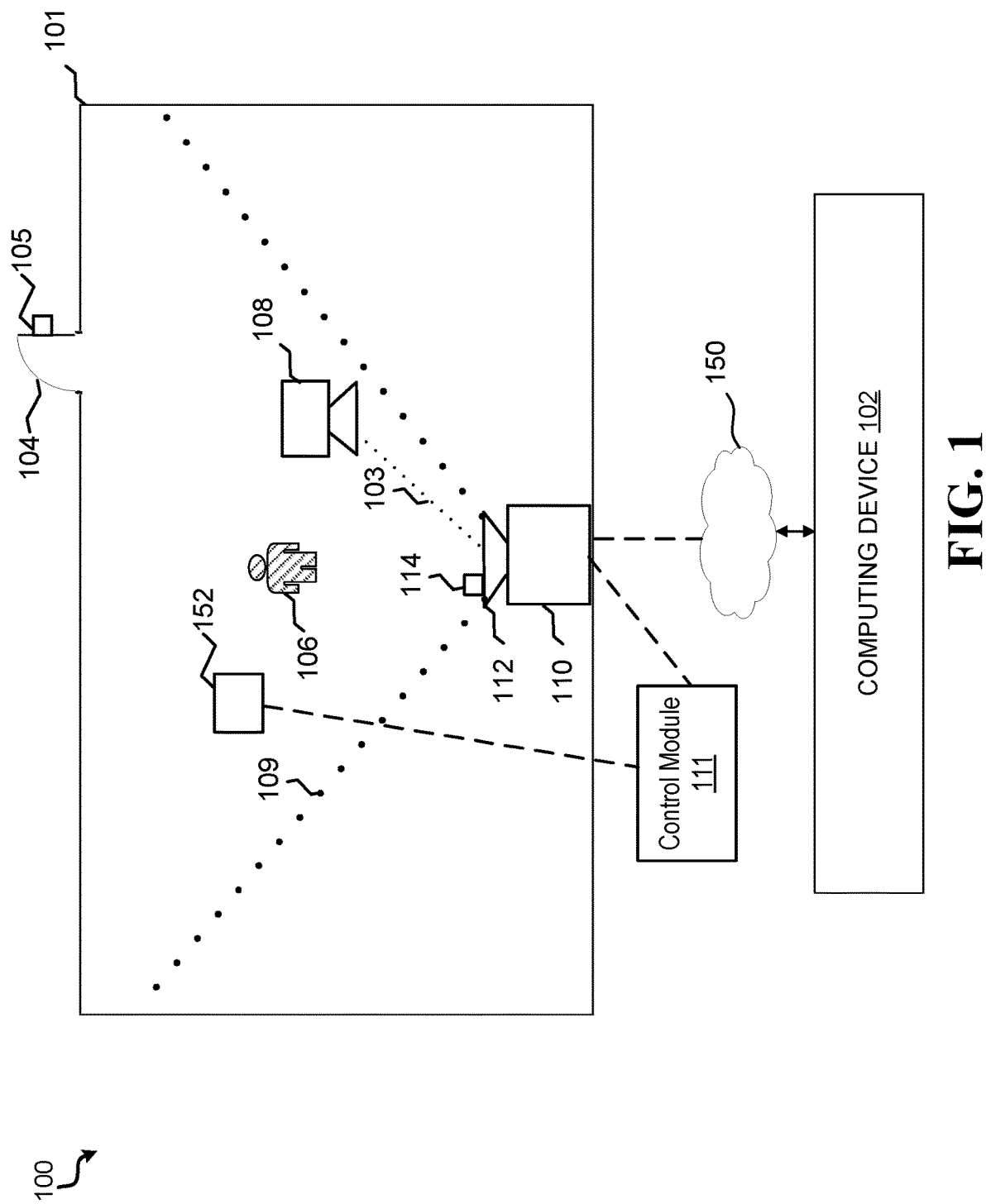
FIG. 1 is a schematic diagram of a temperature measurement system for determining a set of temperature readings of a person attempting to proceed beyond an area.

The method, system and computer-readable medium (e.g., non-transitory computer-readable medium) of the present disclosure may determine a set of temperature readings of a person attempting to proceed beyond an area with improved accuracy.

Temperature measurement anomalies may occur when temperature of one or more body parts of the person occurs. For example, a person resting his/her forehead on his/her palm may have an increased body temperature in the area of the forehead which was in contact with the palm. In another example, a person may apply a cold press on his forehead to temporarily lower the body temperature to avoid detection of an elevated temperature which may be indicative of an illness. The method, system and computer-readable medium of the present disclosure can detect anomalous thermal data (e.g., infra-red (IR readings)) in a temperature scanning system. In such a system, an imaging unit (e.g., a camera) may be communicatively coupled with an analytic unit (e.g., a calibration component) that may analyze the detected temperature readings and provide a notification that the person has an anomalous temperature. The system can detect an inconsistency across multiple temperature measurement points that may or may not be significantly above or below the normal human temperature, but inconsistent across the multiple points which would not be an expected result for elevated body surface temperature detection of a possible febrile condition, low and a high setpoints could be stored in the system such that temperatures that fall outside of that range are identified or detected as anomalous when compared between the multiple points being measured. When an anomalous temperature reading is identified or detected, the person being scanned can be detained for a period of time to determine whether the anomaly may be rectified by allowing the skin to acclimate over a predetermined period of time and then rescanning the person. When the thermal readings are used in conjunction with an access control system, the person may be denied access until their temperature is within the normal range or other policies such as quarantine periods expire based on an access control policy. Additional criteria may include setting a fixed number of failing rescans before the access system prohibits access and refers the person to a security personnel and/or a health professional.

The method, system and computer-readable medium of the present disclosure may account for abnormalities in the scanning process and improve accuracy in identifying symptoms (e.g., a febrile condition) by reducing inconsistencies of temperature readings of a person attempting to proceed beyond an area. The method, system and computer-readable medium of the present disclosure has an improved accuracy (e.g., within +/−0.2 degree Celsius) than other temperature measurement techniques such as thermal handheld devices, thermal camera kiosks, etc. The method, system and computer-readable medium of the present disclosure also includes additional advantages such as no requirement of personnel protective equipment (PPE), not being susceptible to environmental influences, leveraging artificial intelligence to reduce anomalies due to false positives, reduced false negatives, enhanced rate of readings (e.g., up to 15 faces per minute), etc. Further, the method, system and computer-readable medium of the present disclosure provides advantages over clinical/electronic thermometers (Food and Drug Administration (FDA) code FLL (Regulation Description: Clinical electronic thermometer)) which may only provide measurement accuracy but not needed adjustments based on ambient environment. The method, system and computer-readable medium of the present disclosure also provides advantages over thermographic systems (FDA product code LHQ (Telethermographic system)) which may be limited to measuring accuracy and drift but not facial detection, accurate determination of forehead location, and temperature anomalies detection. The method, system and computer-readable medium of the present disclosure also allows for flexible integration with other systems such as video management based access control systems, various mounting options to serve different scenarios including commercial buildings, transportation hubs (bus stations, train stations, airports, etc.), sports stadiums, entertainment clubs, manufacturing facilities, retail spaces, healthcare facilities, educational facilities, or other facilities that limit access. Further, the method, system and computer-readable medium of the present disclosure may be used in temporary makeshift facilities such as tents. The method, system and computer-readable medium of the present disclosure may include additional advantages of accurately taking temperature readings without the need of personnel being present at the entrance of or inside the tent.

Referring to FIG. 1, a system diagram 100 for determining a set of temperature readings of a person 106 attempting to proceed beyond an area 101 (e.g., a screening area) may include a computing device 102. The computing device 102 may be communicatively coupled with an imaging and sensing device 110 via a communication network 150 (e.g., a wired or wireless communication network). A calibration device 108 may be located near to, and communicatively coupled with the imaging and sensing device 110 and may measure the ambient temperature for providing/applying adjustments to the temperature readings obtained by the sensing device 114. The imaging and sensing device 110 may include an imaging device 112 (e.g., one or more cameras, one or more closed circuit television (CCTV) cameras, one or more other types of cameras, etc.) which may have a field of view as shown by dotted lines 109 in FIG. 1. The imaging and sensing device 110 may further include a sensing device 114 (e.g., a thermal sensor, a thermal imaging device such as a thermal camera, or other types of thermal imaging devices). In one implementation, the imaging device 112 and the sensing device 114 may be two separate standalone devices. The imaging and sensing device 110 may be communicatively coupled with the calibration device 108 via a wired or wireless communication link 103 (e.g., an optical communication link).

Access to the area 101 may be through an entrance via a control module 111 that may control the operation of a door 104. The control module 111 may control the operation of one or more doors (e.g., upto 32 doors). The control module 111 may selectively open the door 104 based on one or more criteria (e.g., verification of user authentication credentials, a temperature difference being smaller than a threshold, etc.). In one example, the area 101 may be a lobby area of a building and the temperature measurement system of FIG. 1 may selectively allow the person 106 from proceeding beyond the area 101 (i.e., the lobby area of the building) to one or more floors of the building. In this example, the control module 111 may control the operation of one or more elevators (e.g., restrict the elevators from moving beyond the lobby level on determining that the person 106 is not allowed access beyond the area 101). The door 104 may have an identification and authentication device 105 (e.g., a fingerprint reader, a biometric scanner, a radio frequency identifier (RFID) sensor) installed at the door 104 to identify and selectively allow the person 106 enter the through the door 104 into the area 101 based on identification and authentication of the person 106. For example, the identification and authentication device 105 may selectively allow access to people seeking entry through the door 104 at night, weekends and/or holidays. The door 104 may also allow unrestricted access during one or more specified times (e.g., during business hours). The person 106 may be able to freely enter into the area 101 freely through the door 104, e.g., when the area 101 is a lobby of a building, and the system of the present disclosure may be used to selectively allow the person 106 to proceed beyond the area 101, e.g., beyond the lobby of the building to one or more elevators or office spaces.

When the person 106 enters the area 101 through the door 104 into the field of view of the imaging device 112, the imaging device 112 may the detect the presence of the person 106 entering the area 101. The imaging device 112 may capture one or more images, or one or more video frames to detect a facial area of the person 106. For example, the imaging device 112 may utilize one or more artificial intelligence (AI) or machine learning techniques to detect the facial area of the person 106. The AI or machine learning techniques may only detect the presence of the facial area of the person 106, and not identify/recognize the person 106. In one example, the imaging device 112 may utilize a visual sensor for detecting the facial area of the person 106. The imaging device 112 may send the location information of the facial area of the person 106 to the sensing device 114. For example, the imaging device 112 may send coordinates of the location information of the facial area of the person 106 to the sensing device 114. In another example, the imaging device 112 may send an image outline of the facial area of the person 106, with one or more identified points on the image outline (e.g., one or more points in the forehead area, one or more points in a region medially adjacent to the inner canthus of each eye of the person 106) to the sensing device 114. Further, in another example, the imaging device The sensing device 114 may receive the location information of the facial area and generate a thermal image of the person 106. For example, the sensing device 114 may be a thermal imager that generates a thermal image of the image outline received from the imaging device 112. Based on the location information, the sensing device 114 may determine a first set of temperature readings with each of the temperature readings in the first set corresponding to a point of the facial area of the person 106. For example, the sensing device 114 may determine a first set of temperature readings with each of the temperature readings in the first set corresponding to the one or more identified points on the image outline received from the imaging device 112. The sensing device 114 may adjust/calibrate the temperature readings based on one or more inputs received from the calibration device 108. For example, the calibration device 108 may measure the ambient temperature near the sensing device 114 and provide adjustments/apply adjustments (e.g., based on electro-magnetic interference) to the temperature readings obtained by the sensing device 114. The calibration device 108 may also receive ambient temperature readings from one or more temperature measurement devices, or network devices communicatively coupled with the communicatively coupled with the communication network 150. For example, the calibration device 108 may be a black body device that may provide adjustments to the sensing device 114 based on one or more parameters such as stability (reducing fluctuations in temperature measurements), preventing drift (i.e., reducing fluctuations in temperature measurements in a particular temperature range) or accuracy (variation range in temperature readings as compared to the actual temperature). In one implementation, the imaging device 112 may start detecting the person 106 when the person 106 is at a distance from the imaging and sensing device 110. For example, the person 106 may be at a distance of approximately 13 feet (6.5 meters) from the imaging and sensing device 110. The imaging and sensing device 110 and the calibration device 108 may be located at a predetermined distance e.g., a distance of approximately 6.5-9.8 feet (2-3 meters).

The sensing device 114 may send the temperature readings in the first set to the computing device 102. In one example, the sensing device 114 may send the temperature readings in the first set without any further operations (e.g., comparison, calculating a differential, etc.) to the computing device 102. In another example, the computing device 102 may determine a first set of temperature differences between the temperature readings in the first set of temperature readings. For example, a processor of the computing device 102 may determine a temperature difference between a first point at the forehead of the person 106 and a second point at an inner canthus of an eye of the person 106 (as described below with reference to FIGS. 2 and 3). The processor may determine whether one or more of the temperature differences in the first set of temperature differences does not satisfy a threshold. For example, the processor may determine whether one or more of the temperature differences in the first is equal to or greater than a threshold. In one example, the processor may determine that the temperature difference between the forehead and the inner canthus of the eye of the person 106 is greater than a predetermined threshold stored in a memory of the computing device 102. In one implementation, the predetermined threshold may be equal to a difference between the maximum and minimum temperature over which the human body temperature may fluctuate during the day. Further, the threshold may be a calibrated threshold, e.g., a first threshold value when the two temperature readings in the first set (between which the temperature difference is determined) fall within a first range, a second threshold value when the two temperature readings fall within a second range, etc.). Based on determining that at least one of the temperature differences in the first set of temperature differences does not satisfy the threshold (e.g., at least one of the temperature differences is equal to or greater than the threshold), the processor may generate a notification indicating whether the person 106 is allowed access beyond the area. For example, the processor may generate a notification (e.g., a fail notification or a red indication on a notification device) indicating that the person 106 is not allowed to proceed beyond the area 101 when the at least one of the temperature differences in the first set does not satisfy the threshold. Conversely, the processor may generate a notification indicating that the person is allows access beyond the area 101 (e.g., a pass notification or a green indication on the notification device) when the all of the temperature differences in the first set satisfy the threshold (e.g., all are below the threshold). The processor may transmit the notification to one or more output devices. For example, the processor may transmit the notification to an alarm device (e.g., an audio and/or visual alarm) to notify that the person 106 is not allowed access beyond the area 101. In another example, the processor may transmit the notification to a display device that may display to a security personnel that the person 106 is not allowed to proceed beyond the area 101.

In one implementation, on determining that at least one of the temperature differences in the first set of temperature differences does not satisfy the threshold, the processor may instruct the sensing device to wait for a predetermined amount of time, allow the person 106 to be scanned, and determine a second set of temperature readings after the predetermined amount of time. Waiting for the predetermined amount of time to determine the second set of temperature readings may allow correction of anomalies in temperature measurements from one or more points of the facial area of the person 106. For example, after waiting for the predetermined amount of time (e.g., 2-5 minutes, the area of the forehead that was in contact with the arm of the person 106 may return to the body temperature of the person 106). Each of the second set of temperature readings may correspond to the one or more points of the facial area of the person 106. The processor may then determine a second set of one or more temperature differences (similar to the first set of temperature differences as described above) between the temperature readings in the second set of temperature readings. The processor may determine whether one or more of the temperature differences in the second set of temperature differences does not satisfy the threshold. The processor may allow the person 106 to proceed beyond the area 101, in response to determining that none of the temperature differences in the second set of temperature differences does not satisfy the threshold. The processor may generate a notification to indicate that the person 106 is allowed to proceed beyond the area 101. The processor may transmit the notification to one or more output devices, e.g., the processor may transmit the notification to the display device that may display to the security personnel that the person 106 is allowed to proceed beyond the area 101. The computing device 102 may not store temperature readings after generating a notification. For example, the computing device 102 may not store the first set of temperature readings and the second set of temperature readings after generating a notification indicating whether the person 106 is allowed to proceed beyond the area 101.

In one implementation, on determining that at least one of the temperature differences in the second set of temperature differences does not satisfy the threshold, the processor may generate a notification to guide the person 106 to proceed to a predetermined area. The processor may transmit the notification to the one or more output devices. For example, the notification may indicate that the person 106 should proceed to the predetermined area, where the person 106 may be interviewed by a security personnel or a medical professional and/or the person 106 may be asked to temporarily or permanently quarantine.

Figure 2:
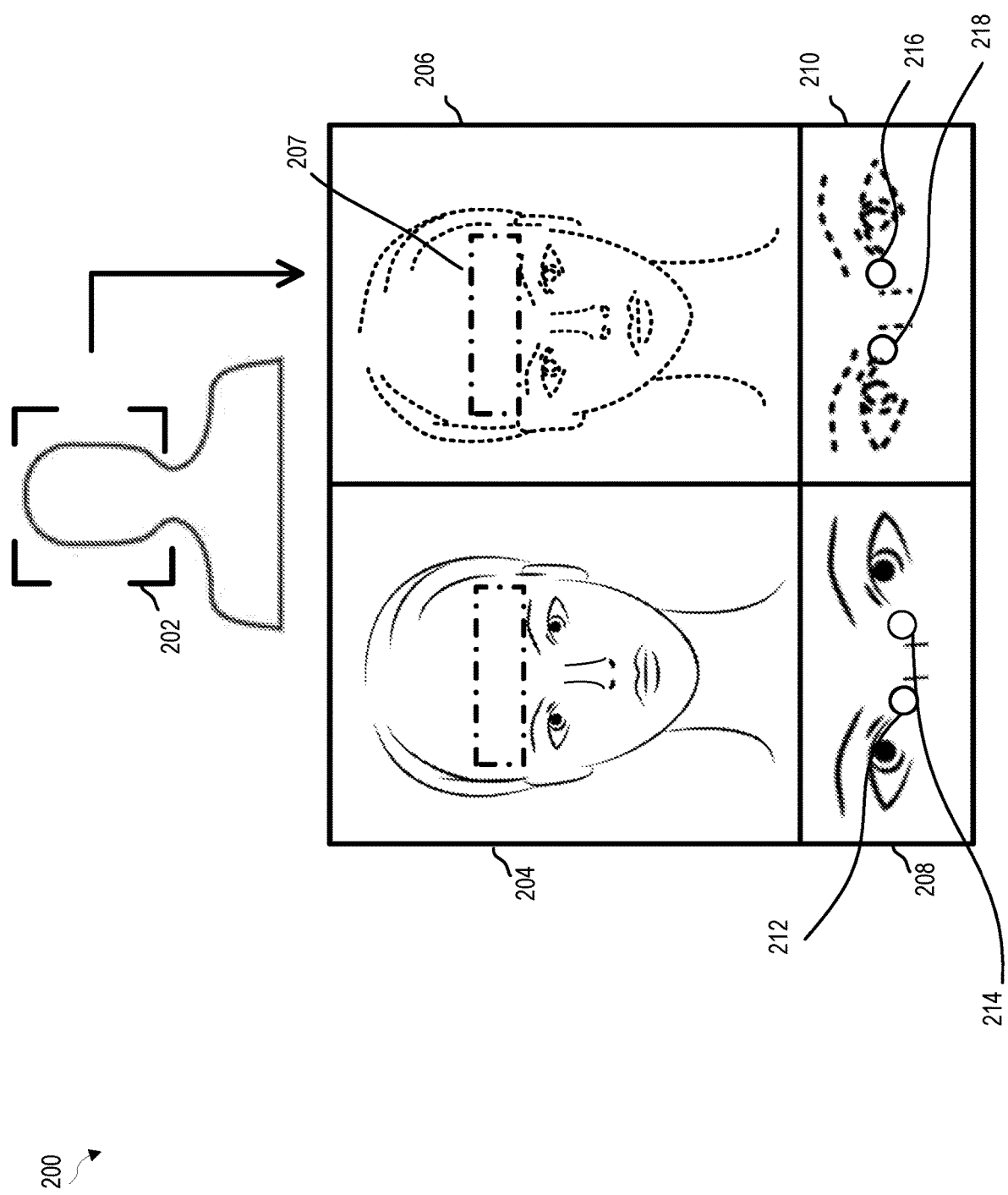
FIG. 2 is an example diagram of one or more points of a facial area of a person where the temperature measurement system may determine temperature readings.

Referring to FIG. 2, a diagram 200 of a facial area of the person 106 (as described above with reference to FIG. 1) includes an image outline 202 of the facial area of the person 106. The image outline 202 of the facial area of the person 106 may be generated by the imaging device 112. In one example, the image outline 202 may have, but is not limited to, a size of 240×180 pixels. The diagram 200 also includes a forehead image 204, a thermal image of the forehead 206, an image of the inner canthi 208 including an image of the inner canthus 212 and an image of the inner canthus 214, and a thermal image of the inner canthi 210. The diagram 200 is an example diagram, and the image outline 202 may include one or more parts of the facial area of the person The forehead and the inner canthi regions of the person 106 may be detected by the imaging device 112 or the sensing device 114 based on the location information of the facial area of the person 106 received from the imaging device 112. The sensing device 114 may generate a thermal image of the forehead 206, and the thermal image of the inner canthi 210 based on the detection of the forehead and the inner canthi regions of the person 106. The sensing device 114 may determine a temperature reading at each of a point 207 on the forehead of the person 106, and at points 216 and 218 in the inner canthi region of the person 106. The temperature readings at points 207, 216 and 218 may comprise the first set of temperature readings and the second set of temperature readings, as described above with reference to FIG. 1.

Figure 3:
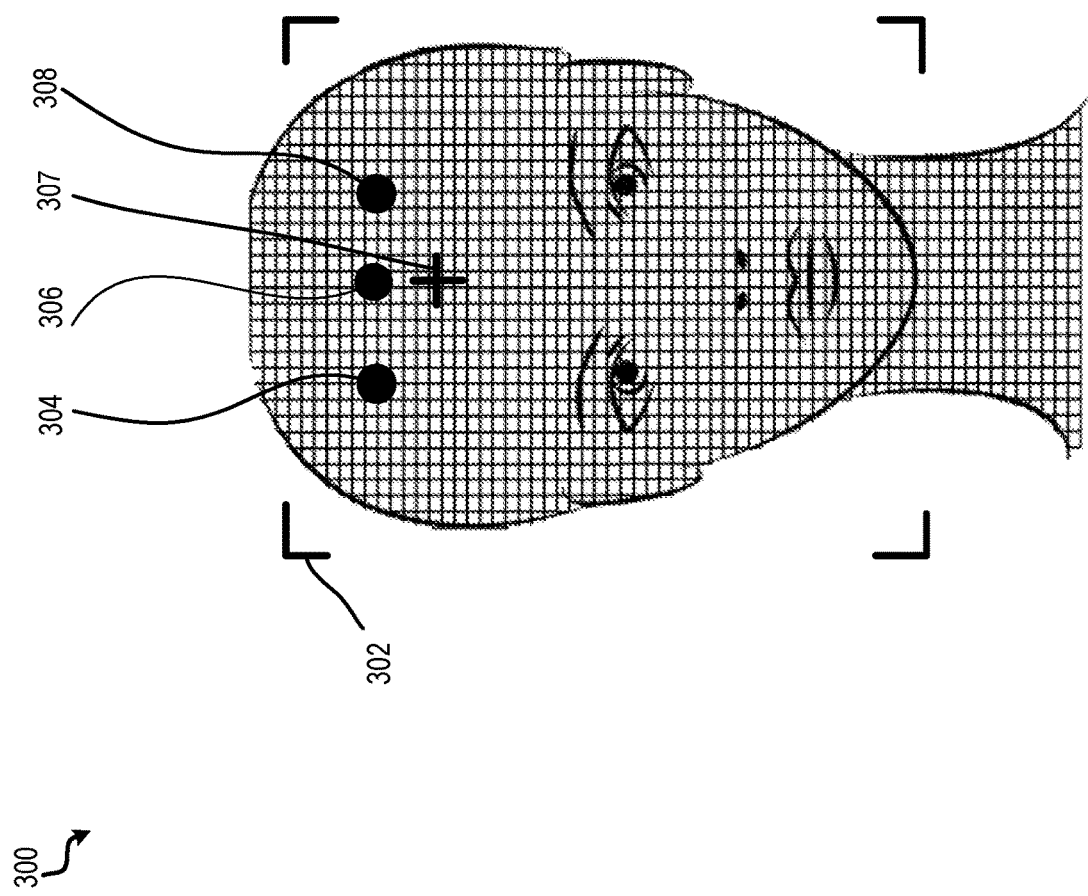
FIG. 3 is another example diagram of one or more points of a facial area of a person where the temperature measurement system may determine temperature readings.

Referring to FIG. 3, a diagram 300 of a facial area of the person 106 (as described above with reference to FIG. 1) includes a three-dimensional image outline 302 of the facial area of the person 106. The three-dimensional image outline 302 may improve the accuracy of temperature readings determined by the sensing device 114, as the location of points (e.g., points 304, 306, 307 and 308) on the facial area of the person 106 can be better determined based on the three-dimensional image outline 302. For example, the points 304, 306 and 308 may be in a left, a center, and a right portion of a forehead, respectively and in the same plain of the facial area of the person 106. The point 307 may be a cross-hair point below the point 306 where the sensing device 114 may read a temperature. The cross-hair point 307 may also indicate how an Automated/Artificial Intelligence identifies a center of the forehead region.

The sensing device 114 may determine temperature readings at each of the points 304, 306 and 308, and the temperature readings at points 304, 306 and 308 may comprise the first set of temperature readings and the second set of temperature readings, as described above with reference to FIG. 1. The method, system and computer-readable medium of the present disclosure are not limited to a three-dimensional image outline. For example the sensing device 114 may determine temperature readings from one or more points on a two-dimensional image outline.

Figure 4:
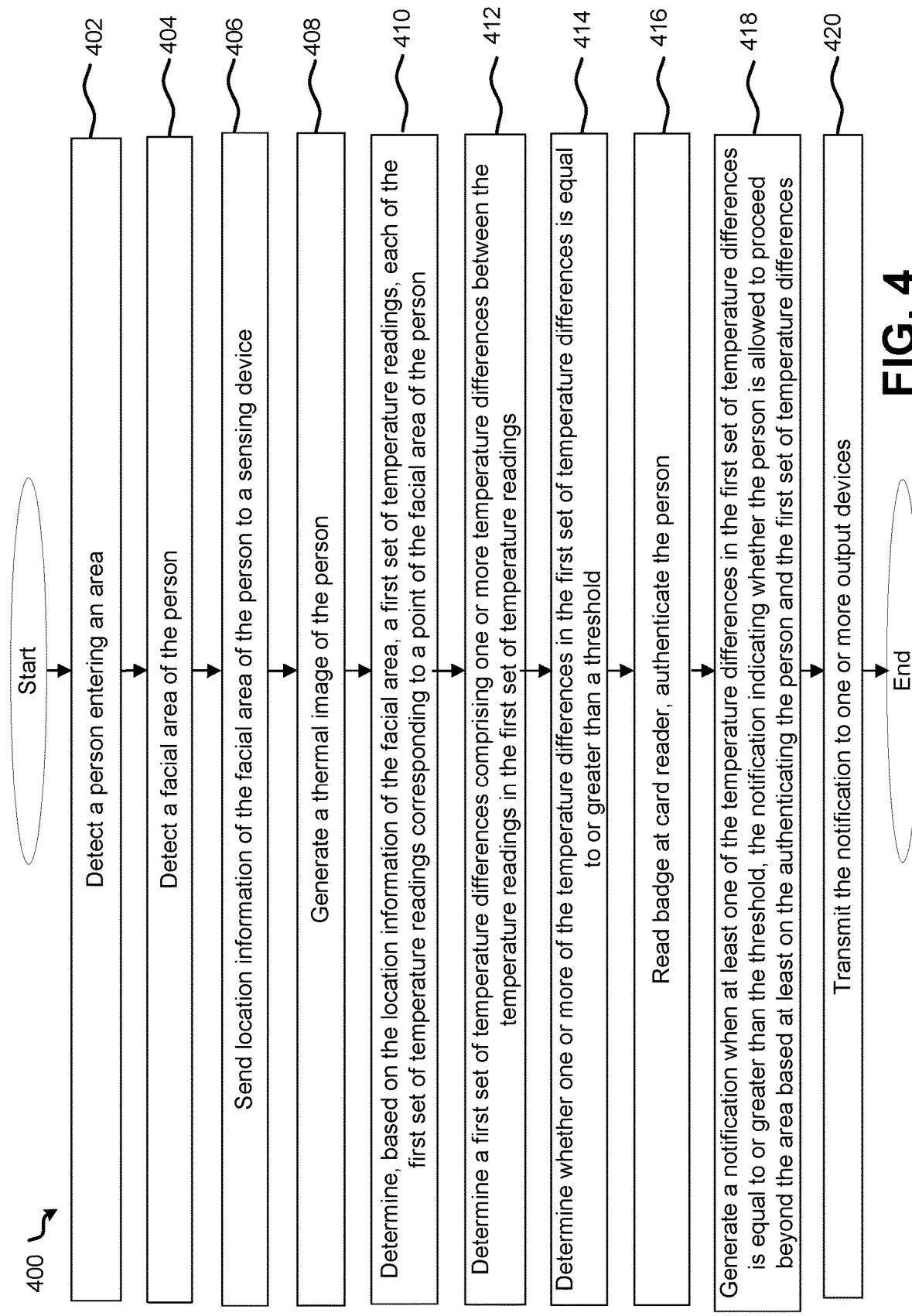
FIG. 4 is flow diagram of an example method of determining a set of temperature readings of a person attempting to proceed beyond an area.

Referring to FIG. 4, the example method 400 determines a set of temperature readings of a person attempting to proceed beyond an area, as described above with reference to FIGS. 1-3.

At block 402, the example method 400 includes detecting a person entering an area. In one implementation, the imaging device 112 (as described above with reference to FIG. 1) detects the person 106 entering the area 101. For example, the imaging device 112 may detect the person 106 based on an ML model and/or an AI model (as described above with reference to FIGS. 1-3). In another implementation, a processor of the computing device 102 may execute one or more instructions stored at a memory of the computing device 102 and/or at receive one or more video frames or images from the imaging device 112 to detect the person 106.

At block 404, the example method 400 includes detecting a facial area of the person. In one implementation, the imaging device 112 may detect the facial area of the person 106. For example, the imaging device 112 may detect the facial area based on an ML model and/or an AI model to detect the facial area of the person 106. In another implementation, the processor of the computing device 102 may execute one or more instructions stored at the in the memory of the computing device 102 to detect the facial area of the person 106. For example, the instructions may include detecting facial contours on the facial area of the person 106.

At block 406, the example method 400 includes sending location information of the facial area of the person to a sensing device. In one implementation, the imaging device 112 may send the location information of the facial area of the person 106 to the sensing device 114. In another implementation, the processor of the computing device 102 may execute one or more instructions stored at the in the memory of the computing device 102, to send location information of the facial area of the person 106 to the sensing device 114. For example, the instructions may include sending an image outline of the facial area of the person 106 as described above with reference to FIGS. 1-3.

At block 408, the example method 400 includes generating a thermal image of the person. In one implementation, the sensing device 114 may generate the thermal image of the person 106. For example, the sensing device 114 may generate a thermal image of the facial area of the person 106. In another implementation, the processor of the computing device 102 may execute one or more instructions stored in the memory of the computing device 102, to generate the thermal image of the person 106. For example, the instructions may include generating a thermal image of the facial area of the person 106.

At block 410, the example method 400 includes determining, based on the location information of the facial area, a first set of temperature readings, each of the first set of temperature readings corresponding to a point of the facial area of the person. In one implementation, the sensing device 114 may determine the first set of temperature readings. For example, the sensing device 114 may measure temperature at one or more points (such as the points 207, 216 and 218 as described above with reference to FIG. 2) as the first set of temperature readings. In another implementation, the processor of the computing device 102 may execute one or more instructions stored in the memory of the computing device 102 to measure the temperature at one or more points as the first set of temperature readings.

At block 412, the example method 400 includes determining a first set of temperature differences comprising one or more temperature differences between the temperature readings in the first set of temperature readings. In one implementation, the processor of the computing device 102 may execute one or more instructions stored in the memory to determine the temperature differences between the temperature readings. For example, the instructions may specify determining the temperature differences between the temperature readings at the points 207, 216, the temperature differences between the temperature readings at the points 207, 218, and the temperature differences between the temperature readings at the points 218, 216. The processor may store the first set of temperature differences in the memory of the computing device 102.

At block 414, the example method 400 includes determining whether one or more of the temperature differences in the first set of temperature differences does not satisfy a threshold. In one implementation, the processor of the computing device 102 may execute one or more instructions stored in the memory to determine whether the one or more of the temperature differences in the first set of temperature differences does not satisfy the predetermined threshold (as described above with reference to FIGS. 1-3).

At block 416, the example method 400 includes reading a badge at card reader. In one implementation, the processor of the computing device 102 may execute one or more instructions stored in the memory to prompt the person 106 to present their badge at the RFID card reader 152. The processor may receive authentication credentials of the person 106 when the person presents their badge at the RFID card reader 152. The processor may then authenticate the person 106 (i.e., verify that the person 106 is allowed access beyond the area 101) based on verifying their authentication credentials (e.g., by comparing the authentication credentials of the person 106 against credentials stored in a database).

At block 418, the example method 400 includes generating a notification when at least one of the temperature differences in the first set of temperature differences does not satisfy the threshold, the notification indicating whether a person is allowed access to proceed beyond the area based at least on the authenticating the person and the first set of temperature differences. In one implementation, the processor of the computing device 102 may execute one or more instructions stored in the memory to generate the notification. For example, the instructions may include generating one or a combination of an audio notification, a text notification, a picture notification, or a video notification. In one example, the notification may indicate that the person 106 is not allowed access to proceed beyond the area 101 based on either of a failed authentication of the person 106 (e.g., a match not being found in the database for the authentication credentials of the person 106 at block 416), or the determination that the first set of temperature differences satisfies the threshold at block 414 (e.g., at least one of the temperature differences in the first set of temperature differences being equal to or greater than the threshold). In another example, the person 106 may be allowed access to proceed beyond the area 101 based on successful authentication of the person 106 (e.g., a match not being found in the database for the authentication credentials of the person 106 at block 416, or authentication of the person 106 based on a guest badge), and the first set of temperature differences not satisfying the threshold at block 414 (e.g., each of the first set of temperature differences being smaller than the threshold).

At block 420, the example method 400 includes transmitting the notification to one or more output devices. In one implementation, the processor of the computing device 102 may execute one or more instructions stored in the memory to transmit the notification to one or more output devices. For example, the instructions may include sending the notification to a control system, or to a security management personnel (as described above with reference to FIGS. 1-3). The one or more output devices may display the notification (e.g., an audio alarm, a visual alarm, an audio-visual alarm) to alert a security personnel, or display the notification on a display monitored by the security personnel. Further, in one implementation the instructions may include sending the notifications to a security system from an RFID card reader 152, or the control module 111, or similar security devices of a security system that controls access to the area beyond the area 101, to indicate to the security system whether the person 106 is allowed to go beyond the area 101.

In one implementation, the processor of the computing device 102 may receive data from one or more components including the imaging device 112, the sensing device 114, or the calibration device 108, and perform one or more operations on the received data based on one or more instructions stored in the memory of the computing device 102 to perform the operations as described above in the example method 400 in FIG. 4.

Figure 5:
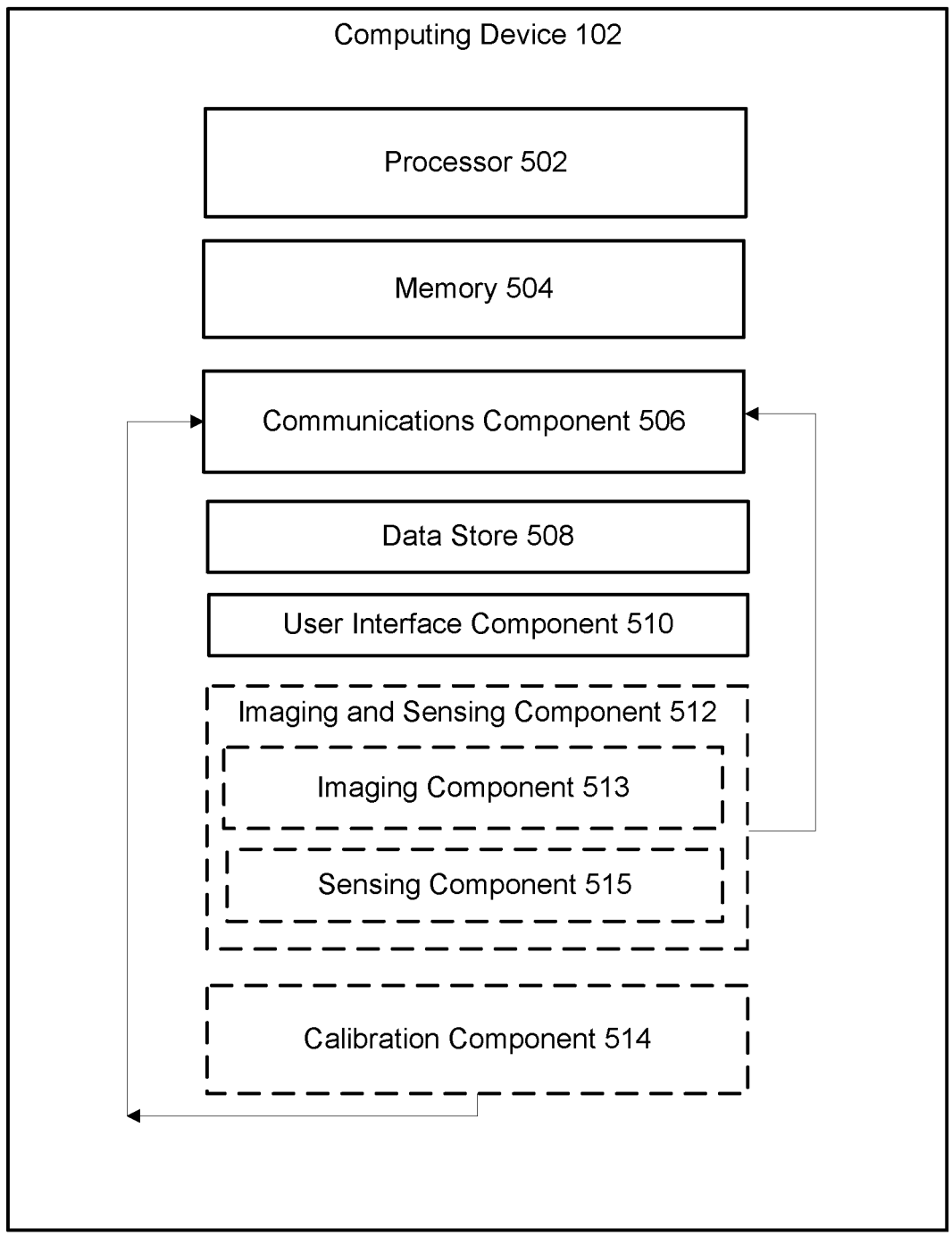
FIG. 5 is a system diagram of an example computing device operable to determine a set of temperature readings of a person attempting to proceed beyond an area.

Referring to FIG. 5, an example computing device 102, for determining a set of temperature readings of a person attempting to proceed beyond an area, as described above with reference to FIGS. 1-4 includes a number of components configured to perform the functions described herein. The computing device 102 may include one or more components of a computer system such as a processor 502, one or more memories, such as the memory 504, configured to execute instructions stored in the imaging and sensing component 512 and the calibration component 514. The imaging and sensing component 512 and the calibration component 514 may perform similar functions as the imaging and sensing device 110 and the calibration device 108, respectively, as described above with reference to FIGS. 1-4. The imaging and sensing component 512 may include an imaging component 513 and a sensing component 515, which may perform similar functions as the imaging device 112 and the sensing device 114, as described above with reference to FIGS. 1-4. The computing device 102 may optionally include a data store 508 to store one or more temperature readings and one or more temperature differences as described above with reference to FIGS. 1-4. The computing device 102 may include a communications component 506 to enable communication of the computing device 102 with one or more network devices or databases (e.g., the network devices or databases coupled to the communication network 150, as described above with reference to FIG. 1). The computing device 102 may optionally include a user interface component 510 to receive one or more inputs from a user managing the access beyond the area 101 (e.g., through a keyboard, a mouse, a touchscreen, etc.) and to display information to the user (e.g., a monitor, a touchscreen, etc.). Various software aspects are described in terms of this example computing device 102. After reading this description, it will become apparent to a person skilled in the relevant art(s) how to implement aspects of the disclosure using other computer systems and/or architectures.

The memory 504 of the computing device 102 may be a main memory, preferably random access memory (RAM). The computing device 102 may include a secondary memory, for example, a hard disk drive, and/or a removable storage drive representing a floppy disk drive, a magnetic tape drive, an optical disk drive, a universal serial bus (USB) flash drive, etc. The removable storage drive may read from and/or writes to a removable storage unit in a well-known manner. Removable storage unit may represent a floppy disk, magnetic tape, optical disk, USB flash drive, a solid state drive (SSD), etc., which is read by and written to the removable storage drive. As will be appreciated, the removable storage unit may include a computer usable storage medium having stored therein computer software and/or data to perform one or more operations as described above with reference to FIGS. 1-4.

In this document, the terms "computer program medium" and "computer usable medium" are used to refer generally to non-transitory computer-readable media stored on a non-transitory memory device, which may include devices such as a removable storage unit and a hard disk installed in a hard disk drive in the computing device 102. These computer program products provide software to the computing device 102. Aspects of the present disclosure are directed to such computer program products. Computer programs (also referred to as computer control logic) are stored in memory 504 and/or secondary memory. Such computer programs, when executed, enable the computing device 102 to perform the features in accordance with aspects of the present disclosure, as discussed herein. In particular, the computer programs, when executed, enable the processor 502 to perform the features in accordance with aspects of the present disclosure. Accordingly, such computer programs represent controllers of the computing device 102.

In an aspect of the present disclosure where the disclosure is implemented using software, the software may be stored in a computer program product and loaded into computing device 102 using removable storage drive, hard drive, or the communications component 506. The control logic (software), when executed by the processor 502, causes the processor 502 to perform the functions described herein. In another aspect of the present disclosure, the system is implemented primarily in hardware using, for example, hardware components, such as application specific integrated circuits (ASICs). Implementation of the hardware state machine so as to perform the functions described herein will be apparent to persons skilled in the relevant art(s).

As used herein, an element or step recited in the singular and proceeded with the word "a" or "an" should be understood as not excluding plural elements or steps, unless such exclusion is explicitly recited. Furthermore, references to "one embodiment" are not intended to be interpreted as excluding the existence of additional embodiments that also incorporate the recited features.

The various embodiments or components described above, for example, the imaging and sensing component 512 including the imaging component 513 and the sensing component 515, the calibration component 514, the computing device 102, and the components or processors therein, may be implemented as part of one or more computer systems. Such a computer system may include a computer, an input device, a display unit and an interface, for example, for accessing the Internet. The computer may include a microprocessor. The microprocessor may be connected to a communication bus. The computer may also include memories. The memories may include Random Access Memory (RAM) and Read Only Memory (ROM). The computer system further may include a storage device, which may be a hard disk drive or a removable storage drive such as a floppy disk drive, optical disk drive, and the like. The storage device may also be other similar means for loading computer programs or other instructions into the computer system. As used herein, the term "software" includes any computer program stored in memory for execution by a computer, such memory including RAM memory, ROM memory, EPROM memory, EEPROM memory, and non-volatile RAM (NVRAM) memory. The above memory types are exemplary only, and are thus not limiting as to the types of memory usable for storage of a computer program.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The invention claimed is:

1. A method of determining a set of temperature readings of a person attempting to proceed beyond an area, comprising:
   detecting, at an imaging device, the person entering the area;
   detecting, at the imaging device, a facial area of the person;
   sending, from the imaging device, location information of the facial area of the person to a sensing device;
   generating, at the sensing device, a thermal image of the person;
   determining, at the sensing device, based on the location information of the facial area, a first set of temperature readings, each of the temperature readings in the first set corresponding to a point of the facial area of the person;
   determining, at a processor of a computing device, a first set of temperature differences comprising one or more temperature differences between the temperature readings in the first set of temperature readings;
   reading, at a card reader, a badge of the person;
   authenticating the person, based at least on the reading of the badge;
   determining, at the processor, whether one or more of the temperature differences in the first set of temperature differences does not satisfy a threshold;
   generating, at the processor, a notification when at least one of the temperature differences in the first set of temperature differences does not satisfy the threshold, the notification indicating whether the person is allowed to proceed beyond the area based at least on the authenticating the person and the first set of temperature differences; and
   transmitting, from the processor, the notification to one or more output devices.

2. The method of claim 1, further comprising:
   adjusting, at the sensing device, the first set of temperature readings based on inputs from a calibration device, wherein the calibration device monitors ambient temperature of the area, the adjusting based on one or more of stability, drift or accuracy.

3. The method of claim 1, wherein the one or more points of the facial area include one or more points in a region medially adjacent to an inner canthus of each eye.

4. The method of claim 1, wherein the notification indicates the person is not allowed to proceed beyond the area, the method further comprising:
   determining, a second set of temperature readings, each of the second set of temperature readings corresponding to the one or more points of the facial area of the person after a predetermined amount of time;
   determining, at the processor, a second set of one or more temperature differences between the temperature readings in the second set of temperature readings;
   determining, at the processor, whether one or more of the temperature differences in the second set of temperature differences does not satisfy a threshold;
   allowing the person to proceed beyond the area, in response to determining that none of the temperature differences in the second set of temperature differences does not satisfy the threshold;
   generating, at the processor, a notification to indicate that the person is allowed to proceed beyond the area; and
   transmitting, from the processor, the notification to one or more output devices.

5. The method of claim 4, further comprising:
   generating, at the processor, a notification to guide the person to proceed to a predetermined area when at least one of the temperature differences in the second set of temperature differences does not satisfy the threshold; and
   transmitting, from the processor, the notification to the one or more output devices.

6. A temperature measurement system for determining a set of temperature readings of a person attempting to proceed beyond an area, comprising:
   an imaging device configured to detect a person entering the area;
   the imaging device configured to detect a facial area of the person;
   the imaging device configured to send location information of the facial area of the person to a sensing device;
   the sensing device configured to generate a thermal image of the person;
   the sensing device configured to determine, based on the location information of the facial area, a first set of temperature readings, each of the first set of temperature readings corresponding to a point of the facial area of the person; and
   the temperature measurement system further comprising:
      a memory in communication with a processor; and
      the processor configured to:
         determine a first set of temperature differences comprising one or more temperature differences between the temperature readings in the first set of temperature readings;
         determine whether one or more of the temperature differences in the first set of temperature differences does not satisfy a threshold;
         read a badge of the person at a card reader;
         authenticate the person, based at least on the reading of the badge;
         generate a notification when at least one of the temperature differences in the first set of temperature differences does not satisfy the threshold, the notification indicating whether the person is allowed to proceed beyond the area based at least on the authentication of the person and the first set of temperature differences; and transmit the notification to one or more output devices.

7. The temperature measurement system of claim 6, wherein the sensing device is further configured to:

adjust the first set of temperature readings based on inputs from a calibration device, wherein the calibration device monitors ambient temperature of the area, the adjusting based on one or more of stability, drift or accuracy.

8. The temperature measurement system of claim 7, wherein the sensing device is located at a predetermined distance from the calibration device.

9. The temperature measurement system of claim 6, wherein the one or more points of the facial area include one or more points in a region medially adjacent to an inner canthus of each eye.

10. The temperature measurement system of claim 6, wherein the notification indicates the person is not allowed to proceed beyond the area, the processor is further configured to:

instruct the sensing device to determine a second set of temperature readings, each of the second set of temperature readings corresponding to the one or more points of the facial area of the person after a predetermined amount of time;

determine a second set of one or more temperature differences between the temperature readings in the second set of temperature readings;

determine whether one or more of the temperature differences in the second set of temperature differences does not satisfy a threshold;

allow the person to proceed beyond the area, in response to determining that none of the temperature differences in the second set of temperature differences does not satisfy the threshold;

generate a notification to indicate that the person is allowed to proceed beyond the area; and transmit the notification to one or more output devices.

11. The temperature measurement system of claim 10, wherein the processor is further configured to:

generate a notification to guide the person to proceed to a predetermined area when at least one of the temperature differences in the second set of temperature differences does not satisfy the threshold; and transmit the notification to the one or more output devices.

12. A non-transitory computer-readable medium storing instructions for determining a set of temperature readings of a person attempting to proceed beyond an area, the instructions executable by a processor configured to:

detect, at an imaging device, the person entering the area;

detect, at the imaging device, a facial area of the person;

send, from the imaging device, location information of the facial area of the person to a sensing device;

generate, at the sensing device, a thermal image of the person;

determine, at the sensing device, based on the location information of the facial area, a first set of temperature readings, each of the temperature readings in the first set corresponding to a point of the facial area of the person;

determine a first set of temperature differences comprising one or more temperature differences between the temperature readings in the first set of temperature readings;

read, at a card reader, a badge of the person;

authenticate the person, based at least on the reading of the badge;

determine whether one or more of the temperature differences in the first set of temperature differences does not satisfy a threshold;

generate a notification when at least one of the temperature differences in the first set of temperature differences does not satisfy the threshold, the notification indicating whether the person is allowed to proceed beyond the area based at least on the authenticating the person and the first set of temperature differences; and transmitting, from the processor, the notification to one or more output devices.

13. The non-transitory computer-readable medium of claim 12, wherein the processor is further configured to:

adjust, at the sensing device, the first set of temperature readings based on inputs from a calibration device, wherein the calibration device monitors ambient temperature of the area, the adjusting based on one or more of stability, drift or accuracy.

14. The non-transitory computer-readable medium of claim 12, wherein the one or more points of the facial area include one or more points in a region medially adjacent to an inner canthus of each eye.

15. The non-transitory computer-readable medium of claim 12, wherein the notification indicates the person is not allowed to proceed beyond the area, wherein the processor is further configured to:

determine, a second set of temperature readings, each of the second set of temperature readings corresponding to the one or more points of the facial area of the person after a predetermined amount of time;

determine a second set of one or more temperature differences between the temperature readings in the second set of temperature readings;

determine whether one or more of the temperature differences in the second set of temperature differences does not satisfy a threshold;

allow the person to proceed beyond the area, in response to determining that none of the temperature differences in the second set of temperature differences does not satisfy the threshold;

generate a notification to indicate that the person is allowed to proceed beyond the area; and transmit the notification to one or more output devices.

16. The non-transitory computer-readable medium of claim 15, wherein the processor is further configured to:

generate a notification to guide the person to proceed to a predetermined area when at least one of the temperature differences in the second set of temperature differences does not satisfy the threshold; and transmit the notification to the one or more output devices.

* * * * *